(12) United States Patent
Yang

(10) Patent No.: US 12,225,515 B2
(45) Date of Patent: Feb. 11, 2025

(54) CAPABILITY PARAMETER PROCESSING METHOD AND DEVICE, COMMUNICATION DEVICE AND STORAGE MEDIUM

(71) Applicant: XIAOMI COMMUNICATIONS CO., LTD., Beijing (CN)

(72) Inventor: Xing Yang, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 529 days.

(21) Appl. No.: 17/596,834

(22) PCT Filed: Jun. 21, 2019

(86) PCT No.: PCT/CN2019/092417
§ 371 (c)(1),
(2) Date: Dec. 20, 2021

(87) PCT Pub. No.: WO2020/252794
PCT Pub. Date: Dec. 24, 2020

(65) Prior Publication Data
US 2022/0322347 A1    Oct. 6, 2022

(51) Int. Cl.
H04W 72/0453    (2023.01)
H04L 5/00    (2006.01)
H04W 8/24    (2009.01)
H04W 24/10    (2009.01)
H04W 72/21    (2023.01)

(52) U.S. Cl.
CPC ......... *H04W 72/0453* (2013.01); *H04L 5/001* (2013.01); *H04W 8/245* (2013.01); *H04W 24/10* (2013.01); *H04W 72/21* (2023.01)

(58) Field of Classification Search
CPC . H04W 72/0453; H04W 8/245; H04W 24/10; H04W 72/21; H04W 8/24; H04W 8/22; H04L 5/001
See application file for complete search history.

(56) References Cited

U.S. PATENT DOCUMENTS

| | | | |
|---|---|---|---|
| 9,615,245 B2 | 4/2017 | Liang | |
| 10,708,920 B2 * | 7/2020 | Kitazoe | H04W 72/51 |
| 11,234,119 B2 * | 1/2022 | Tenny | H04W 8/22 |
| 11,290,893 B2 * | 3/2022 | Kazmi | H04B 17/336 |

(Continued)

FOREIGN PATENT DOCUMENTS

| | | |
|---|---|---|
| CN | 1750667 A | 3/2006 |
| CN | 1842084 A | 10/2006 |

(Continued)

OTHER PUBLICATIONS

International Search Report in the international application No. PCT/CN2019/092417, mailed on Jan. 7, 2020.

(Continued)

*Primary Examiner* — Brian T O Connor
(74) *Attorney, Agent, or Firm* — Syncoda LLC; Feng Ma

(57) ABSTRACT

A capability parameter processing method includes: receiving two sets of reported capability parameters, wherein one of the two sets of capability parameters are capability parameters of capabilities owned by a terminal, and the other set of capability parameters are capability parameters of capabilities allocated to the current network by a terminal.

17 Claims, 16 Drawing Sheets

(56) References Cited

U.S. PATENT DOCUMENTS

| | | | | |
|---|---|---|---|---|
| 11,647,400 | B2* | 5/2023 | Kazmi | ............ H04W 4/70 |
| | | | | 370/329 |
| 11,864,009 | B2* | 1/2024 | Luo | ............ H04W 24/08 |
| 11,882,064 | B2* | 1/2024 | Tavildar | ............ H04L 5/0053 |
| 2011/0261771 | A1 | 10/2011 | Nagata | |
| 2013/0010645 | A1 | 1/2013 | Yu | |
| 2013/0114508 | A1 | 5/2013 | Liang | |
| 2023/0208578 | A1* | 6/2023 | Liu | ............ H04L 5/0091 |
| | | | | 370/330 |

FOREIGN PATENT DOCUMENTS

| | | |
|---|---|---|
| CN | 101426256 A | 5/2009 |
| CN | 102045763 A | 5/2011 |
| CN | 102378370 A | 3/2012 |
| CN | 103281749 A | 9/2013 |
| CN | 103391533 A | 11/2013 |
| CN | 105722066 A | 6/2016 |
| CN | 106160963 A | 11/2016 |
| CN | 107484251 A | 12/2017 |
| CN | 107889098 A | 4/2018 |
| CN | 108810874 A | 11/2018 |
| CN | 108810877 A | 11/2018 |
| CN | 109587679 A | 4/2019 |
| EP | 2309662 A2 | 4/2011 |
| WO | 2010053054 A1 | 5/2010 |
| WO | 2018130047 A1 | 7/2018 |

OTHER PUBLICATIONS

Written Opinion of the International Search Authority in the international application No. PCT/CN2019/092417, mailed on Jan. 7, 2020.

First Office Action of the Chinese application No. 201980001161.3, issued on Sep. 15, 2021.

Notice of Allowance of the Chinese application No. 201980001161.3, issued on Mar. 11, 2022. 6 pages with English translation.

Zhang Enhai et al. "Design and implementation of mobile terminal application layer software automation test system", Science &Technology Inpornation , Jan. 23, 2015. DOI: 10.16661 /j .cnki.1672 -3791. 2015. 03. 019. 3 pages with English translation.

Christian Bergman et al, "Assessment of Performance Using an Advanced Upper Extremity Prosthesis: a Case Report", Jul. 20, 2017.https://doi.org/10.47739/2578-3572/1006. 6 pages.

* cited by examiner

CAPABILITY PARAMETER PROCESSING METHOD AND DEVICE, COMMUNICATION DEVICE AND STORAGE MEDIUM

CROSS-REFERENCE TO RELATED APPLICATION

This application is a U.S. national stage of International Application No. PCT/CN2019/092417 filed on Jun. 21, 2019, the disclosure of which is hereby incorporated by reference in its entirety.

TECHNICAL FIELD

The disclosure relates to the technical field of wireless communication, but is not limited to the technical field of wireless communication, and particularly, relates to a method and apparatus for processing capability parameters, a communication device, and a storage medium.

BACKGROUND

Currently, in the design of 3G, 4G, and 5G communication systems, each user equipment (UE) will report its own capability, including supported carrier aggregation frequency band combinations, etc. The UE can actively change its capability under certain circumstances, and the UE capability can be increased or decreased in real time. For example, when the UE is overheated, the number of carrier aggregation frequency band combinations may be reduced for the purpose of cooling; and when the temperature is normal, the number of carrier aggregation frequency band combinations may be increased appropriately. However, the change of the UE capability tends to cause communication failure and unknown errors.

SUMMARY

Embodiments of the present disclosure provide a method and apparatus for processing capability parameters, a communication device, and a storage medium.

According to a first aspect of an embodiment of the present disclosure, there is provided a method for processing capability parameters, including:
  receiving two sets of capability parameters that are reported, where one set of the two sets of capability parameters include capability parameters for a capability that a user equipment (UE) has, and another set of the two sets of capability parameters include capability parameters for a capability allocated by the UE to a current network.
  In an embodiment, the method may further include:
  issuing a capability request, where the capability request carries indication information for indicating a capability required by the current network.
  In an embodiment, the issuing the capability request may include:
  after receiving the two sets of capability parameters that are reported, issuing the capability request, in response to determining that the capability allocated by the UE to the current network does not satisfy the capability required by the current network.
  In an embodiment, the method may further include:
  receiving a capability acknowledgement message, where the capability acknowledgement message is configured to indicate that allocation of the required capability indicated by the indication information to the current network is approved;
  or,
  receiving a capability rejection message, where the capability rejection message is configured to indicate that allocation of the required capability indicated by the indication information to the current network is rejected.
  In an embodiment, the method may further include:
  configuring a capability occupation timer, according to information of the capability occupation timer carried in the capability acknowledgement message; and
  releasing an occupied UE capability, in response to expiration of the capability occupation timer.
  In an embodiment, the method may further include:
  before the expiration of the capability occupation timer, re-issuing the capability request;
  receiving a re-reported capability acknowledgement message based on the re-issued capability request; and
  reconfiguring the capability occupation timer, according to the re-reported capability acknowledgement message.
  In an embodiment, the method may further include:
  configuring a capability rejection timer, according to information of the capability rejection timer carried in the capability rejection message;
  where the capability request is not issued until expiration of the capability rejection timer.
  According to a second aspect of the embodiments of the present disclosure, there is further provided a method for processing capability parameters, including:
  reporting two sets of capability parameters, wherein one set of the two sets of capability parameters comprise capability parameters for a capability that a user equipment (UE) has, and another set of the two sets of capability parameters comprise capability parameters for a capability allocated by the UE to a current network.
  In an embodiment, the method may further include:
  receiving a capability request, wherein the capability request carries indication information for indicating a capability required by the current network.
  In an embodiment, the receiving capability request may further include:
  after reporting the two sets of capability parameters, receiving the capability request.
  In an embodiment, the method may further include:
  transmitting a capability acknowledgement message, wherein the capability acknowledgement message is configured to indicate that allocation of the required capability indicated by the indication information to the current network is approved;
  or,
  transmitting a capability rejection message, wherein the capability rejection message is configured to indicate that allocation of the required capability indicated by the indication information to the current network is rejected.
  In an embodiment, the method may further include transmitting a capability release request.
  According to a third aspect of the embodiments of the present disclosure, there is further provided an apparatus for processing capability parameters, including:
  a first receiving module, configured to receive two sets of capability parameters that are reported, where one set of the two sets of capability parameters include capability parameters for a capability that a user equipment (UE) has, and another set of the two sets of capability parameters include capability parameters for a capability allocated by the UE to a current network.

In one embodiment, the apparatus may further include:

a request module, configured to issue a capability request, where the capability request carries indication information for indicating a capability required by a current network.

In an embodiment, the request module may further be configured to, after receiving the two sets of capability parameters that are reported, issue the capability request, in response to determining that the capability allocated by the UE to the current network does not satisfy the capability required by the current network.

In an embodiment, the first receiving module may further be configured to receive a capability acknowledgement message, wherein the capability acknowledgement message is configured to indicate that allocation of the required capability indicated by the indication information to the current network is approved; alternatively, the first receiving module is further configured to receive a capability rejection message, wherein the capability rejection message is configured to indicate that allocation of the required capability indicated by the indication information to the current network is rejected.

In one embodiment, the apparatus may further include:

a configuration module, configured to configure a capability occupation timer, according to information of the capability occupation timer carried in the capability acknowledgement message, and release an occupied UE capability, in response to expiration of the capability occupation timer.

In an embodiment, the configuration module may further be configured to, before the expiration of capability occupation timer, re-issue the capability request, receive a re-reported capability acknowledgement message based on the re-issued capability request, and reconfigure the capability occupation timer, according to the re-reported capability acknowledgement message.

In an embodiment, the configuration module may further be configured to maintain capability occupation of the UE until receiving a capability release request that is reported, in response to the capability acknowledgement message not carrying information of a capability occupation timer.

In an embodiment, the configuration module may further be configured to configure a capability rejection timer, according to information of the capability rejection timer carried in the capability rejection message, where the capability request is not issued until expiration of the capability rejection timer.

In one embodiment, the request module may further be configured to re-issue the capability request, after the expiration of capability rejection timer.

According to a fourth aspect of the embodiments of the present disclosure, there is further provided an apparatus for processing capability parameters, the apparatus include:

a transmitting module, configured to report two sets of capability parameters, where one set of the two sets of capability parameters include capability parameters for a capability that a user equipment (UE) has, and another set of the two sets of capability parameters include capability parameters for a capability allocated by the UE to a current network.

In one embodiment, the apparatus may further include:

a second receiving module, configured to receive a capability request, where the capability request carries indication information for indicating a capability required by the current network.

In one embodiment, the second receiving module may further be configured to, after reporting the two sets of capability parameters, receive the capability request.

In an embodiment, the transmitting module may further be configured to send a capability acknowledgement message, where the capability acknowledgement message is configured to indicate that allocation of the required capability indicated by the indication information to the current network is approved; alternatively, the transmitting module is further configured to send a capability rejection message, where the capability rejection message is configured to indicate that allocation of the required capability indicated by the indication information to the current network is rejected.

In one embodiment, the transmitting module may further be configured to send a capability release request.

According to a fifth aspect of an embodiment of the present disclosure, there is provided a communication device, including:

an antenna;

a memory;

a processor connected to the antenna and the memory, and configured to control the antenna to transmit and receive wireless signals by executing an executable program stored in the memory, and capable of performing steps of a method for processing the capability parameters provided in any of the foregoing technical solutions.

According to a sixth aspect of an embodiment of the present disclosure, there is provided a non-transitory computer-readable storage medium that stores an executable program, where the executable program, when executed by a processor, implements steps of a method for processing capability parameters provided by any of the foregoing technical solutions.

In an embodiment of the present disclosure, a method for processing capability parameters is provided, which includes: receiving two sets of capability parameters that are reported, wherein one set of the two sets of capability parameters include capability parameters for a capability that a user equipment (UE) has, and another set of the two sets of capability parameters include capability parameters for a capability allocated by the UE to a current network. In this way, the base station can be aware of not only the capability parameters for the capability allocated by the UE to the current network, but also the capability parameters for the capability that the UE has. After receiving the two sets of capability parameters that are reported, the base station may perform communication services based on the two sets of capability parameters, thereby reducing the probability of communication failure.

DETAILED DESCRIPTION

Reference will now be made in detail to exemplary embodiments, examples of which are illustrated in the accompanying drawings. The following description refers to the accompanying drawings in which the same reference numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in embodiments of the present disclosure may be for the purpose of describing specific embodiments only, and are not intended to limit embodiments of the present disclosure. The singular forms of "a", "one" and "the" used in the embodiments of the present disclosure and the appended claims may also be intended to include plural forms, unless the context clearly indicates other meanings. It should also be understood that the term "and/or" as used herein may refer to and include any or all possible combinations of one or more associated listed items.

It should be understood that although various information may be described in embodiments of the present disclosure using the terms first, second, third, etc., such information should not be limited to these terms. These terms may be used only to distinguish information of the same type from each other. For example, without departing from the scope of the embodiments of the present disclosure, the first information may also be referred to as the second information; and similarly, the second information may also be referred to as the first information. Depending on the context, the words "if" and "in response that" as used herein may be interpreted as "when . . . ", "at the time . . . " or "in response to determining".

Figure 1:
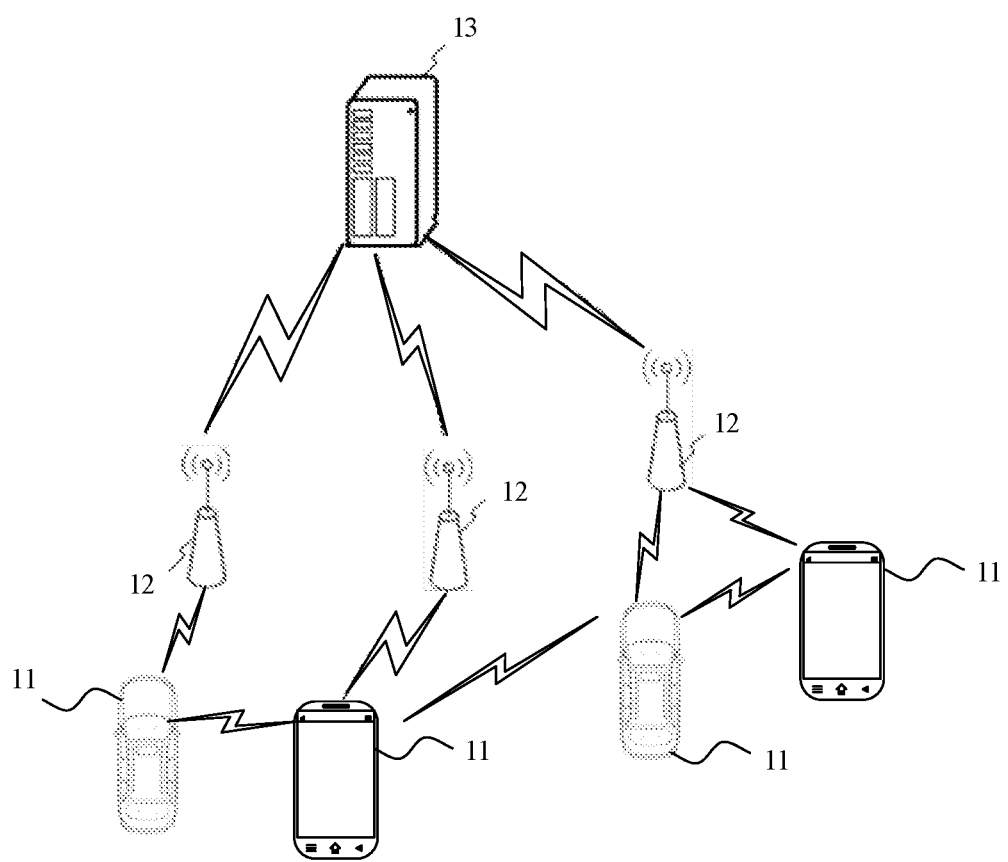
FIG. 1 is a schematic structural diagram of a wireless communication system according to an embodiment of the present disclosure.

Referring to FIG. 1, a schematic structural diagram of a wireless communication system according to an embodiment of the present disclosure is shown. As shown in FIG. 1, a wireless communication system may be a communication system based on cellular mobile communication technology, and the wireless communication system may include a plurality of user equipment (UEs) 11 and a plurality of base stations 12.

The UE 11 may be a device that provides voice and/or data connectivity to a user. The UE 11 may communicate with one or more core networks through a radio access network (RAN). The UE 11 may be an Internet of Things terminal device, such as a sensor device, a mobile phone (or referred to as a "cellular" phone), and a computer having an Internet of Things terminal device (e.g., a fixed device, a portable device, a pocket-sized device, a handheld device, a computer built-in device, or an in-vehicle device). For example, a station (STA), a subscriber unit, a subscriber station, a mobile station, a mobile, a remote station, an access point, a remote terminal, an access terminal, a user terminal, a user agent, a user device, or a user equipment (UE). Alternatively, the UE 11 may be a device of an unmanned aerial vehicle. Alternatively, the UE 11 may be a vehicle-mounted device, for example, a trip computer having a wireless communication function, or a wireless communication device connected to a trip computer. Alternatively, the UE 11 may be a roadside device, such as a street lamp having a wireless communication function, a signal lamp, or other roadside devices.

The base station 12 may be a network-side device in the wireless communication system. The wireless communication system may be the 4th generation mobile communication (4G) system, also known as a long term evolution (LTE) system. Alternatively, the wireless communication system may be a 5G system, also known as a new radio system or a 5G NR system. Alternatively, the wireless communication system may be a further next generation system of the 5G system. The access network in the 5G system may be referred to as a New Generation-Radio Access Network (NG-RAN). Alternatively, the wireless communication system may also be a MTC system.

The base station 12 may be an evolved NodeB (eNB) used in the 4G system. Alternatively, the base station 12 may be a base station (gNB) using a centralized distributed architecture in the 5G system. When the base station 12 adopts the centralized distributed architecture, it generally includes a central unit (CU) and at least two distributed units (DUs). The central unit is provided with a protocol stack including a packet data convergence protocol (PDCP) layer, a radio link control (RLC) layer, and a media access control (MAC) layer. And the distributed unit is provided with a protocol stack including a physical (PHY) layer.

A wireless connection may be established between the base station 12 and the UE 11 through a wireless air interface. In various embodiments, the wireless air interface may be a wireless air interface based on the fourth generation mobile communication network technology (4G) standard. Alternatively, the wireless air interface may be a wireless air interface based on the fifth generation mobile communication network technology (5G) standard, for example, the wireless air interface may be a new radio. Alternatively, the wireless air interface may be a wireless air interface based on the next generation mobile communication network technology standard of 5G.

In some embodiments, an End to End (E2E) connection may also be established between UEs 11. For example, the (E2E) connection may include vehicle to vehicle (V2V) communication, vehicle to Infrastructure (V2I) communication, and vehicle to pedestrian (V2P) communication in vehicle to everything (V2X) communication.

In some embodiments, the wireless communication system may further include a network management device 13.

A plurality of base stations 12 may be respectively connected to the network management device 13. The network management device 13 may be a core network device in the wireless communication system. For example, the network management device 13 may be a mobility management entity (MIME) in an evolved packet core (EPC) network. Alternatively, the network management device may be other core network devices, such as a serving gateway (SGW), a public data network gateway (PGW), a policy and charging rules function (PCRF), or a home subscriber server (HSS). The embodiment of the present disclosure will not be limited to the implementation form of the network management device 13.

Figure 2:
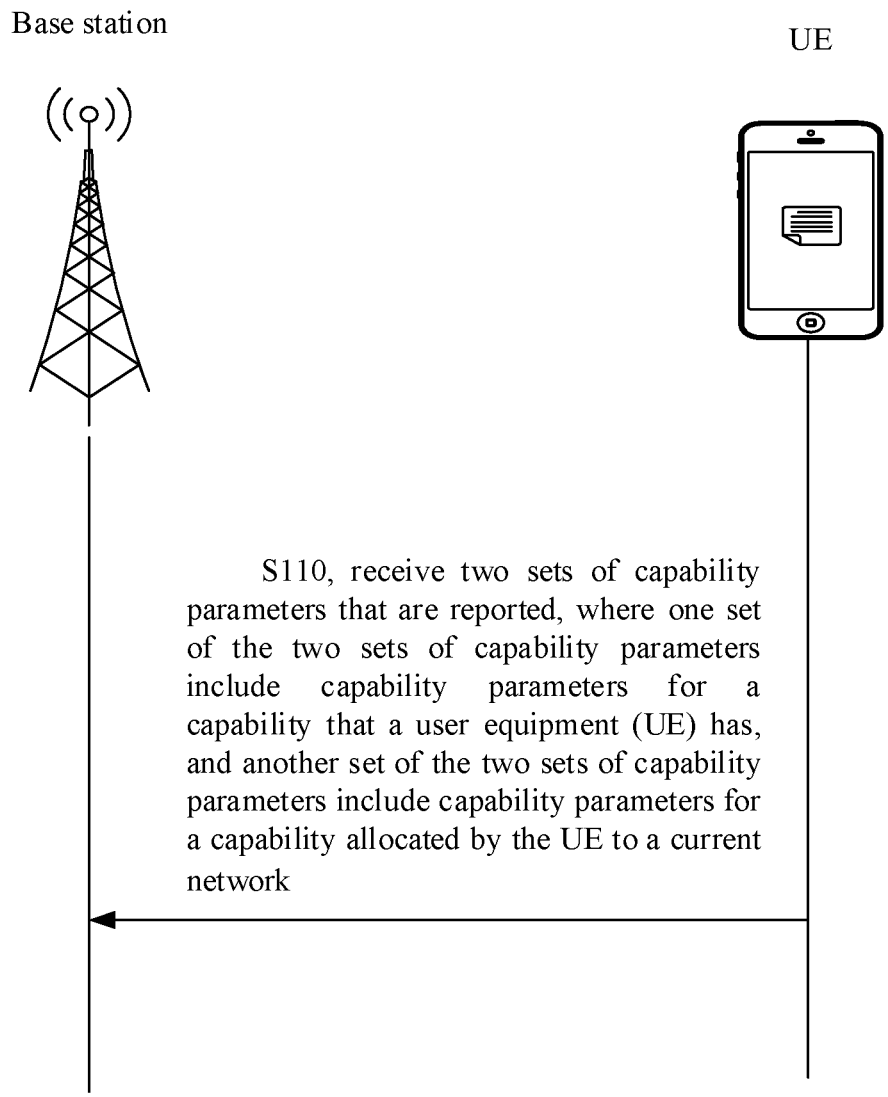
FIG. 2 is a flowchart of a method for processing capability parameters according to an embodiment of the present disclosure.

As shown in FIG. 2, an embodiment of the present disclosure provides a method for processing capability parameters, which includes step S110.

In S110, two sets of capability parameters that are reported are received. One set of the two sets of capability parameters include capability parameters for a capability that a user equipment (UE) has, and another set of the two sets of capability parameters include capability parameters for a capability allocated by the UE to a current network.

The capability parameters for the capability that the UE has may be used to indicate the parameters for the communication capability that the UE has. The communication capability may include, but is not limited to, a carrier aggregation capability. For example, the capability parameters for the capability that the UE may be used to indicate whether the UE can support carrier aggregation in a frequency band a, a frequency band b, and a frequency band c, and also indicate a direction in which the carrier aggregation can be supported. The direction of the carrier aggregation may include an uplink transmitting direction and a downlink receiving direction.

The capability parameters for the capability that the UE has may be further used to indicate whether the UE can support carrier aggregation in the frequency band a and the frequency band b, and also indicate the direction in which the carrier aggregation can be supported. The direction of the carrier aggregation may include the uplink transmitting direction and the downlink receiving direction.

The UE may be a single-card UE or a multi-card UE. The single-card UE may be a UE including one subscriber identification module. The multi-card UE may be a UE including multiple subscriber identification modules, and the multi-card UE may be a UE including at least two subscriber identification modules, for example, a dual-card UE or a triple-card UE. The UE behavior mode with multiple subscriber identification modules may be dual-card dual-standby single-pass, dual-card dual-standby dual-pass, triple-card triple-pass, etc. The subscriber identification module may be a subscriber identification module (SIM) card existing in a separate individual form, or an embedded subscriber identification module (e-SIM) that exists inside the UE in an integrated form, etc.

The method for processing the capability parameters may be applied to a network device on the network side, for example, various types of base stations, 3G base stations, 4G base stations, 5G base stations, macro base stations, micro base stations, or small base stations.

In the embodiment of the present disclosure, the base station can learn not only the capability parameters for the capability allocated by the UE to the current network, but also the capability parameters for the capability that the UE has. After receiving the two sets of capability parameters that are reported, the base station may perform communication services based on the two sets of capability parameters, thereby reducing the probability of communication failure.

In some embodiments, the capability that the UE has may be different from the capability allocated to the current network. For example, the capability allocated to the current network may be part of the capability that the UE has.

For example, the UE has the capability to perform carrier aggregation on N carriers. However, according to a current transmission requirement and a channel quality, the UE determines that M carriers need to be aggregated. Therefore, the carrier aggregation capability allocated to the current network is M/N, where M is a positive integer less than N, and N is a positive integer not less than 2.

For another example, when a multi-card UE accesses networks from a plurality of operators, the multi-card UE may allocate capability for the networks corresponding to the plurality of operators. For example, the multi-card UE may include a card 1 and a card 2. The card 1 may be used to access a network corresponding to the operator 1, the card 2 may be used to access a network corresponding to the operator 2, the multi-card UE may allocate capability to the network corresponding to the operator 1 and the network corresponding to the operator 2, and each of the networks may obtain part of the capability that the UE has.

It should be noted that, after performing capability allocation for the plurality of networks, the multi-card UE may have remaining capability that has not been allocated. The capability that the multi-card UE has may be a sum of parameters corresponding to the capability that has been allocated to the operator networks (i.e. one type of the current networks) and the remaining capability that has not been allocated. It should be noted that, since the capability that the multi-card UE has is allocated (occupied by the network(s)) and released at any time, the remaining capability without allocation may be dynamically changed.

Figure 3:
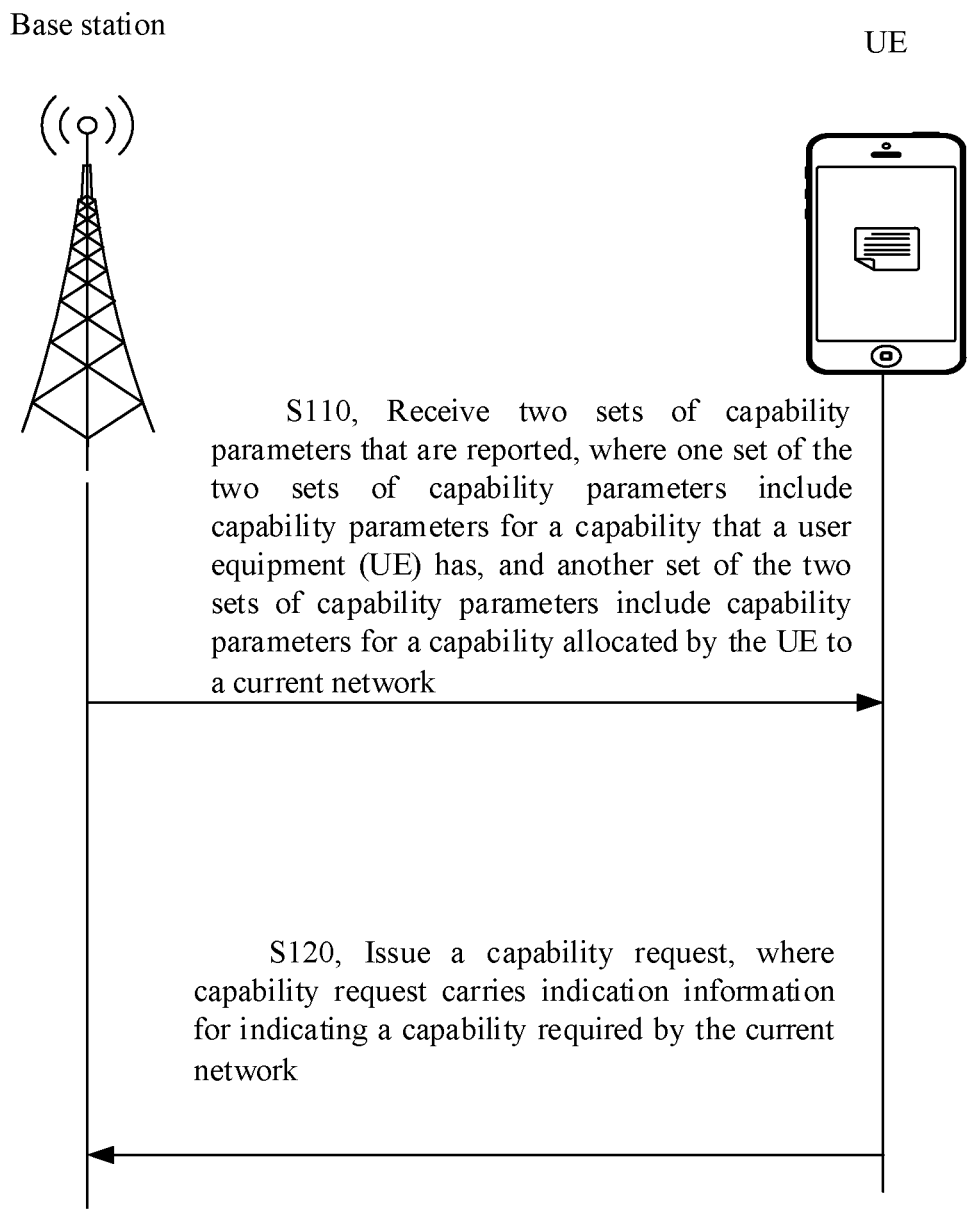
FIG. 3 is a flowchart of a method for processing capability parameters according to another embodiment of the present disclosure.

As shown in FIG. 3, another embodiment of the present disclosure provides a method for processing capability parameters. The method may further include step S120 of issuing a capability request. The capability request may carry indication information for indicating a capability required by the current network.

The indication information that indicates the capability required by the current network may be information determined based on the quality of service parameters of the current network. For example, when a required downlink service rate corresponding to the quality of service parameters for the current network is 500 mb/s, the determined indication frequency band information may be requirement information of the downlink reception capability corresponding to the frequency bands a, b and c.

The capability request may be transmitted by means of dedicated signaling, here the dedicated signaling may mean that the signaling merely carries the capability request information.

The capability request may also be carried in shared signaling and transmitted. Here, the shared signaling may mean that the signaling carries other types of information in addition to the capability request information. Use of shared signaling may save signaling resources.

The capability request may be transmitted periodically, or may be transmitted based on a data transmission condition of a current network service. For example, when a service quality fluctuation parameter value corresponding to the service quality that corresponds to the current data transmission is within a set threshold value range, the frequency of transmission of the capability request may be increased. When the service quality fluctuation parameter value corresponding to the service quality that corresponds to the current data transmission is outside the set threshold value range, the frequency of transmission of the capability request may be decreased. Here, the capability request may be transmitted when the base station determines, after receiving the downlink service, that the capability of the current UE does not satisfy the quality-of-service requirement corresponding to the downlink service. For example, if the downlink service requires a transmission rate of 500 mb/s, while the transmission rate allocated by the UE to the network corresponding to the base station is merely 400 mb/s, the base station determines that the current UE capability does not satisfy the current service requirement, and issues a capability request indicating that the capability needs to be increased to the UE.

In an embodiment, the step of S120 may include: after receiving the two sets of capability parameters that are reported, issuing the capability request, in response to determining that the capability allocated by the UE to the current network does not satisfy the capability required by the current network.

Here, in an implementation of the issuing of the capability request in response to determining that the capability allocated by the UE to the current network does not satisfy the capability required by the current network, the capability request may be issued in response to determining that the capability allocated by the UE to the current network does not meet the quality-of-service requirement corresponding to the downlink service. For example, if the transmission rate required by the quality-of-service requirement corresponding to the downlink service is 500 mb/s, while the transmission rate corresponding to the capability allocated by the UE to the current network is merely 400 mb/s, it can be determined that the capability allocated by the UE to the current network does not satisfy the capability required by the current network.

Here, the capability request may include a requirement of the UE capability corresponding to a service quality performance parameter, for example, the requirement for the downlink carrier aggregation capability corresponding to the frequency bands a, b, and c. When the UE decides to approve the request from the base station, the UE adjusts its internal circuit, so that the UE can support the implementation of the corresponding capability. For example, the antenna circuit within the UE may be adjusted such that the antenna can support the carrier aggregation.

Here, after receiving the two sets of capability parameters that are reported, the capability request may be re-issued. In this way, it can reduce the waste of signaling resources caused by frequently transmitting the capability request without being aware of the UE capability.

It should be noted that in some embodiments, the two sets of capability parameters reported by the UE may be reported according to the capability request.

Figure 4:
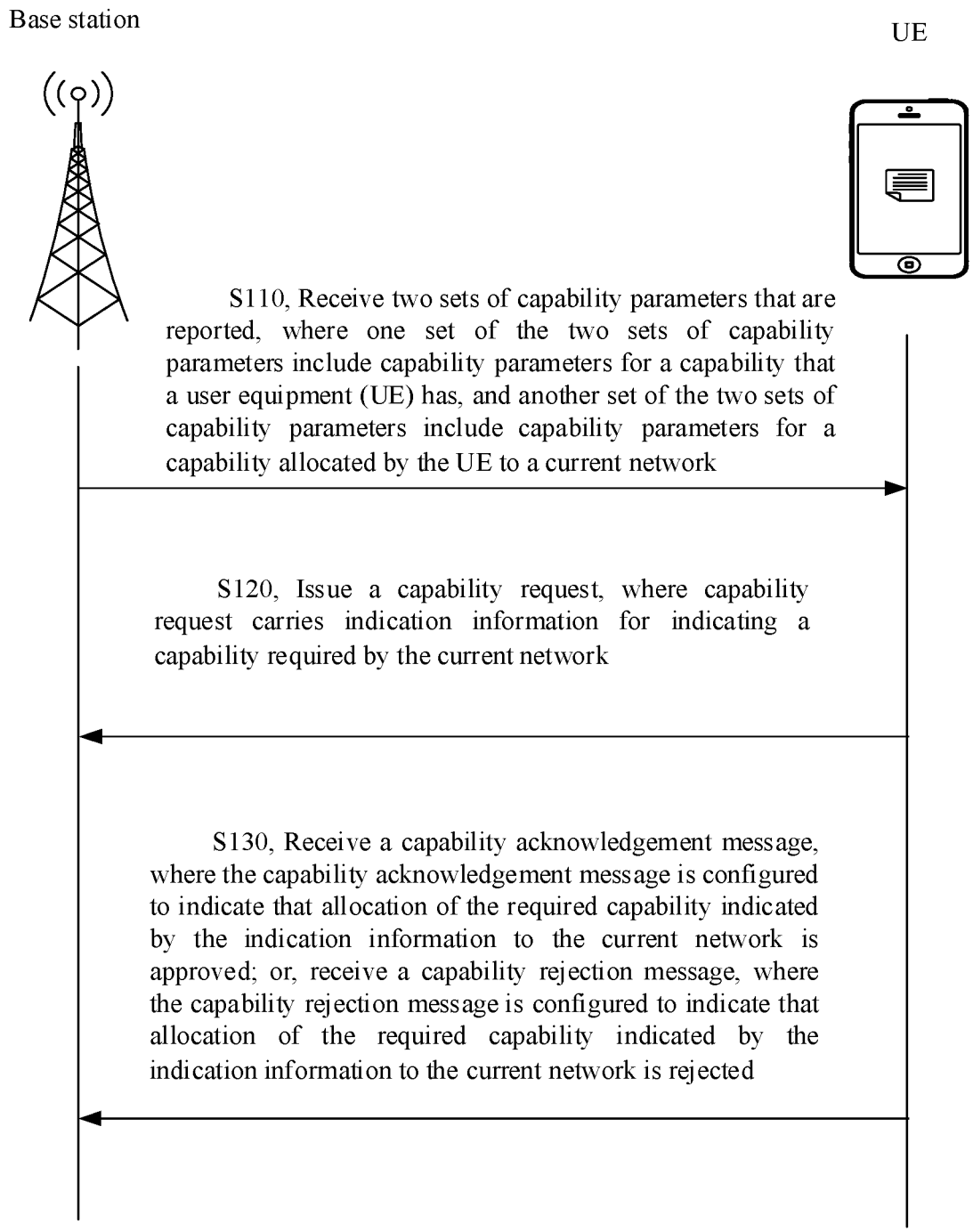
FIG. 4 is a flowchart of a method for processing capability parameters according to another embodiment of the present disclosure.

As shown in FIG. 4, another embodiment of the present disclosure provides a method for processing capability parameters, and the method may further include step S130 of receiving a capability acknowledgement message. The capability acknowledgement message may be configured to indicate that allocation of the required capability indicated by the indication information to the current network is approved.

Alternatively, the step S130 may include receiving a capability rejection message. The capability rejection message may be configured to indicate that allocation of the required capability indicated by the indication information to the current network is rejected.

Here, the UE may determine to transmit the capability acknowledgement message or the capability rejection message to the base station according to 5G QoS Indicator (5QI) or a QoS Class Identifier (QCI) carried in the capability request. The 5QI or QCI herein may include at least one of latency, rate, or service processing priority. Taking that the 5QI includes a service processing priority as an example, according to a preset rule, when a set value of the service processing priority in the 5QI carried in the request message is greater than a preset first threshold value, the UE may transmit the capability acknowledgement message to the base station; and when the set value of the service processing priority in the 5QI carried in the request message is less than or equal to the preset first threshold value, the UE may transmit the capability rejection message to the base station. For example, when the service processing priority is greater than 5, the capability acknowledgement message may be transmitted; and when the service processing priority is less than or equal to 5, the capability rejection message may be transmitted.

After receiving the capability acknowledgement message or the capability rejection message, the base station can be aware about whether the general corresponding capability of the UE is occupied, and reduce the interruption of other important services within the UE caused by mandatory occupation, etc.

Figure 5:
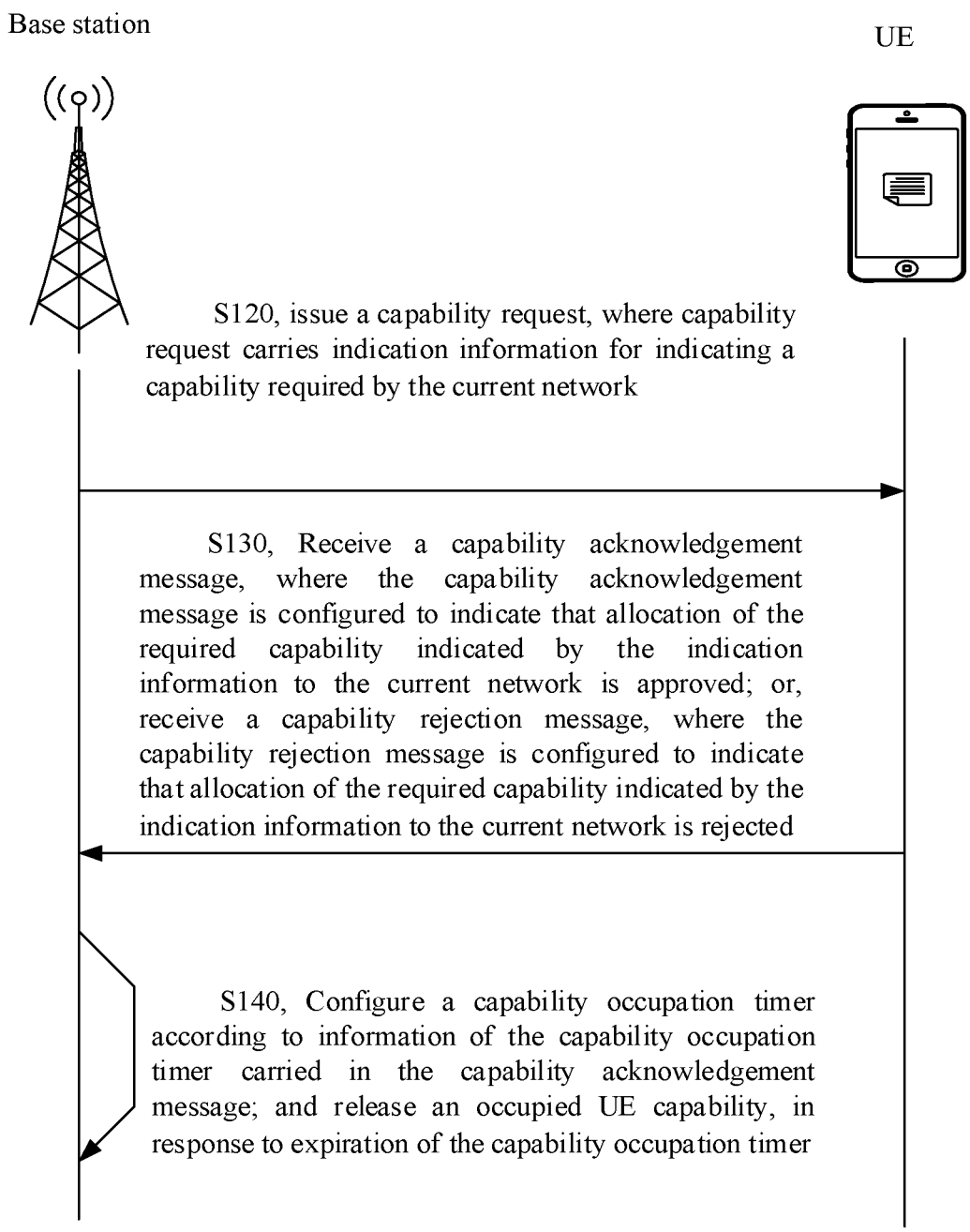
FIG. 5 is a flowchart of a method for processing capability parameters according to another embodiment of the present disclosure.

As shown in FIG. 5, another embodiment of the present disclosure provides a method for processing capability parameters, which may include step S140.

In S140, a capability occupation timer is configured according to information of the capability occupation timer carried in the capability acknowledgement message; and an occupied UE capability is released, in response to expiration of the capability occupation timer.

Here, the carried information of the capability occupation timer may include at least one of the following information:
information about the duration for occupying the corresponding UE capability; information about the start time for occupying the corresponding UE capability; information about the end time for occupying the corresponding UE capability, and the like, which may be time parameters directly or indirectly used to determine occupation of the UE capability.

The operation of configuring the capability occupation timer may be configuring the time parameters such as the duration, the start time, and the end time of the capability occupation timer. Here, the capability occupation timer may be started upon receiving the information of the capability occupation timer carried in the acknowledgement message. And in response to the expiration of the capability occupation timer, the occupied UE capability may be released. Here, the operation of releasing the occupied UE capability may mean that the base station no longer occupies the UE capability resource, and the released UE capability resource may be re-allocated by the UE.

Figure 6:
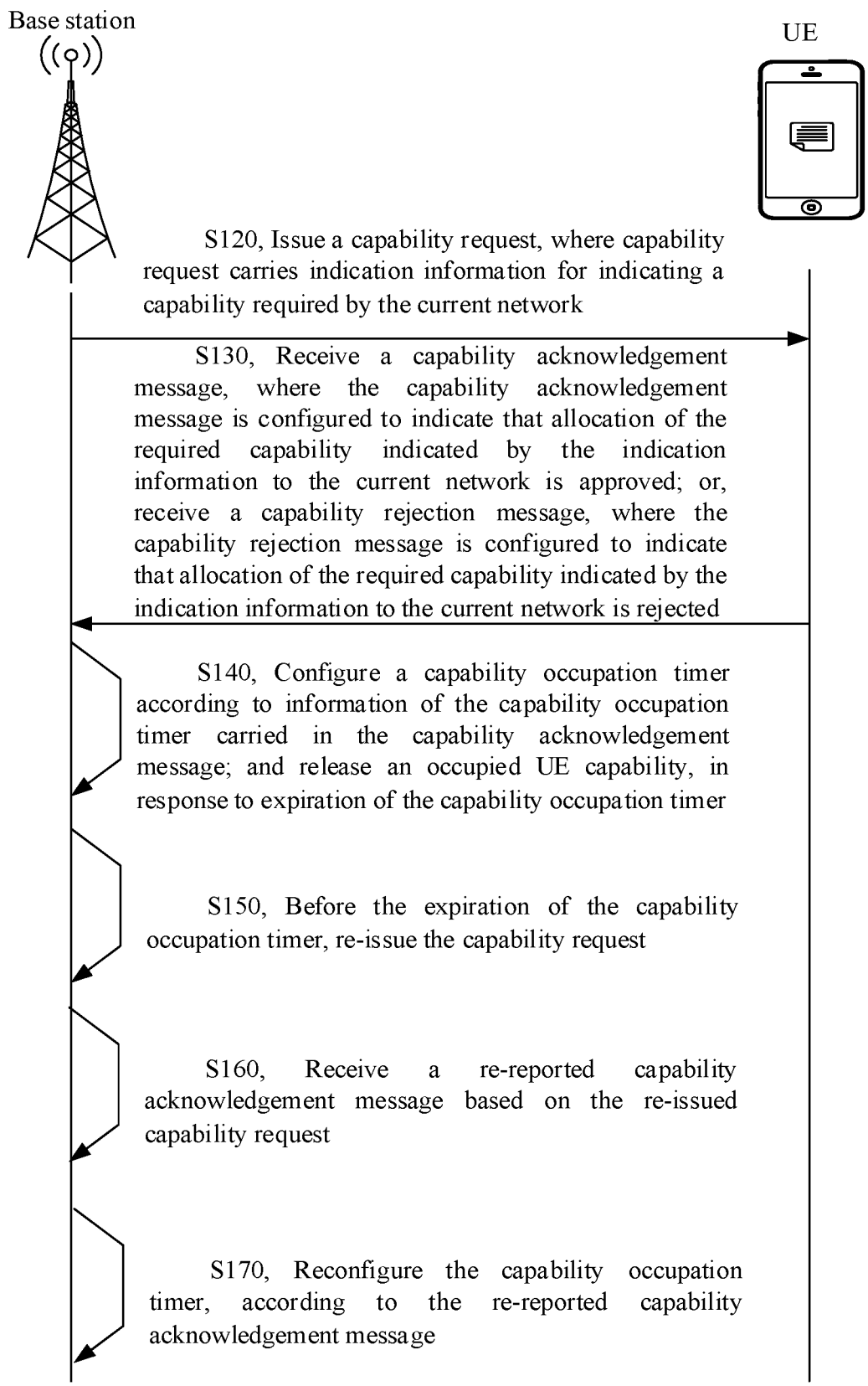
FIG. 6 is a flowchart of a method for processing capability parameters according to another embodiment of the present disclosure.

As shown in FIG. 6, another embodiment of the present disclosure provides a method for processing capability parameters, which may include the following steps S150 to S170.

In S150, before the expiration of the capability occupation timer, the capability request may be re-issued.

In S160, a re-reported capability acknowledgement message may be received based on the re-issued capability request.

In S170, the capability occupation timer may be reconfigured, according to the re-reported capability acknowledgement message.

Here, before the expiration of the capability occupation timer, the capability request may be re-issued. In this way, the base station can re-request the UE capability resource, reconfigure the capability occupation timer, and maintain the continued occupation of the UE capability resource by the base station. Therefore, the service interruption caused by the timeout of the capability occupation timer can be reduced, and the service continuity can be improved.

In an embodiment, the method further includes maintaining the capability occupation of the UE until receiving a capability release request that is reported, in response to the capability acknowledgement message not carrying information of the capability occupation timer.

Here, the request message not carrying the timing information may be taken as an indication for maintaining the occupation of the UE capability. Before receiving the capability release request that is reported, the base station may occupy the UE capability resource all the time. Therefore, it may reduce waste of system resources due to repeatedly transmission of the capacity request in response to the expiration of the capacity occupation timer, given that the capacity occupation timer is set with the time parameters. Meanwhile, in response to receiving the capability release request that is reported, the corresponding UE capability is released, and the UE capability is no longer occupied.

Figure 7:
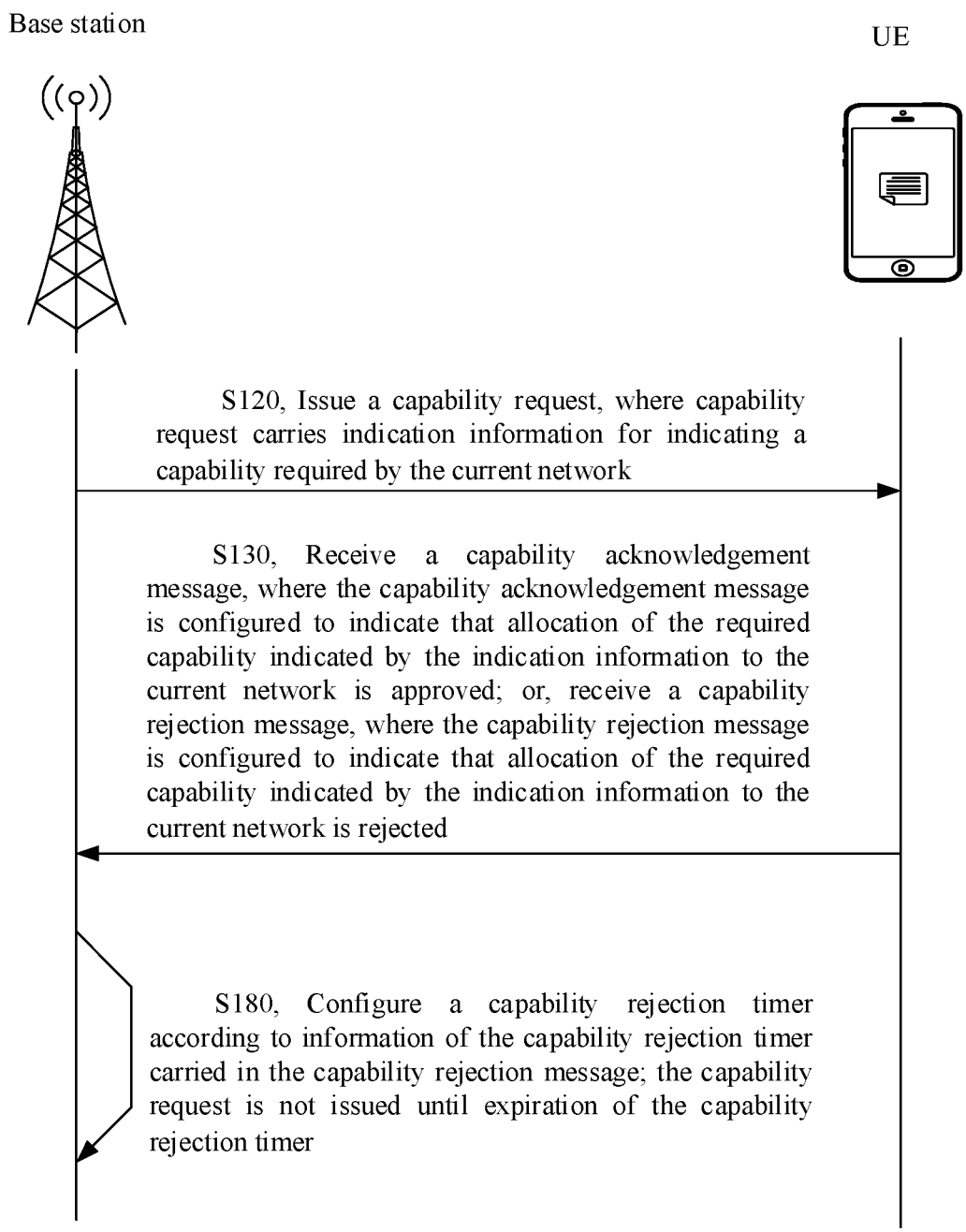
FIG. 7 is a flowchart of a method for processing capability parameters according to another embodiment of the present disclosure.

As shown in FIG. 7, another embodiment of the present disclosure provides a method for processing capability parameters, which may include step S180.

In S180, a capability rejection timer may be configured according to information of the capability rejection timer carried in the capability rejection message; and the capability request may not be issued until expiration of the capability rejection timer.

Here, the information of the capability rejection timer carried in the capability rejection message may include at least one of the following: information about the duration at which the UE rejects the capability occupation, information about the start time at which the UE rejects the capability occupation, information about the end time at which the UE rejects the capability occupation, which may be time parameters directly or indirectly used to determine that the UE rejects the capability occupation.

The operation of configuring the capability rejection timer may be configuring the time parameters such as the duration, the start time, and the end time for the capability rejection timer. Here, the capability rejection timer may be started upon receiving the information of the capability rejection timer carried in the rejection message. The capability request is not issued before the expiration of the capability rejection timer. Therefore, the interference to allocation of the UE capability resources caused by issuing the capability request to the UE can be reduced.

In one embodiment, the method may further include re-issuing the capability request, after the expiration of the capability rejection timer.

Here, after the expiration of the capability rejection timer, the capability request may be re-issued. In this way, the capability request may be re-issued after the expiration of capability rejection timer. On the one hand, the interference to allocation of the UE capability resources caused by frequently issuing the capability request can be reduced. On the other hand, the timeliness needs of the base station service for the UE capability can be satisfied.

Figure 8:
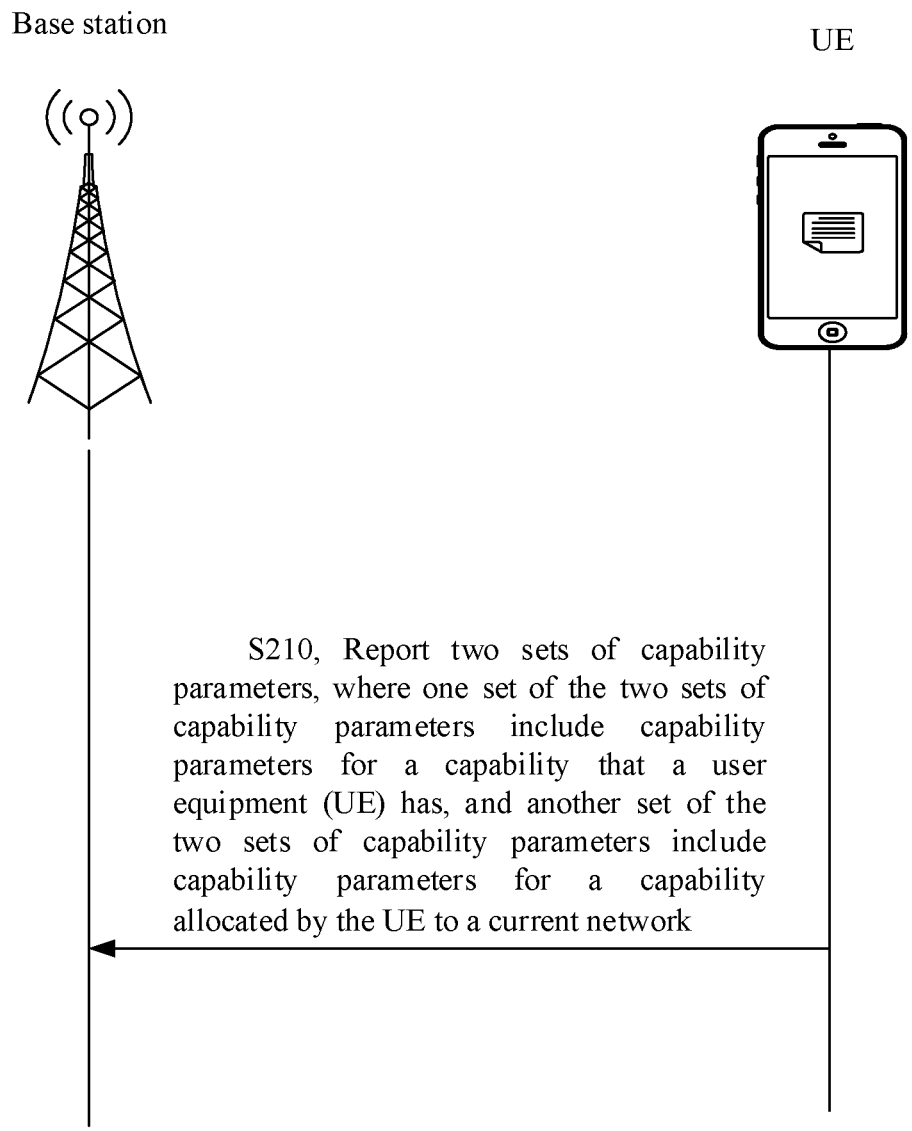
FIG. 8 is a flowchart of a method for processing capability parameters according to another embodiment of the present disclosure.

As shown in FIG. 8, another embodiment of the present disclosure provides a method for processing capability parameters, which includes step S210.

In S210, two sets of capability parameters are reported. One set of the two sets of capability parameters comprise capability parameters for a capability that a user equipment (UE) has, and another set of the two sets of capability parameters comprise capability parameters for a capability allocated by the UE to a current network.

Here, the capability parameters for the capability that the UE has may be parameters indicating the communication capability that the UE has. The communication capability may include, but is not limited to, a carrier aggregation capability. For example, the capability parameters for the capability that the UE has may be used to indicate whether the UE supports carrier aggregation in a frequency band a, a frequency band b, and a frequency band c, and indicate the supported direction of the carrier aggregation. The direction of the carrier aggregation may include an uplink transmitting direction and a downlink receiving direction. The capability parameters for the capability that the UE has may be further used to indicate whether the UE supports carrier aggregation in the frequency band a and the frequency band b, and indicate the supported direction of the carrier aggregation. The direction of the carrier aggregation may include the uplink transmitting direction and the downlink receiving direction.

In the embodiment of the present disclosure, the UE can transmit not only the capability parameters for the capability allocated to the current network, but also the capability parameters for the capability that the UE has to the base station. In this way, after the base station receives the two sets of capability parameters that are reported, the base station may perform communication services based on the two sets of capability parameters, thereby reducing the probability of communication failure.

Figure 9:
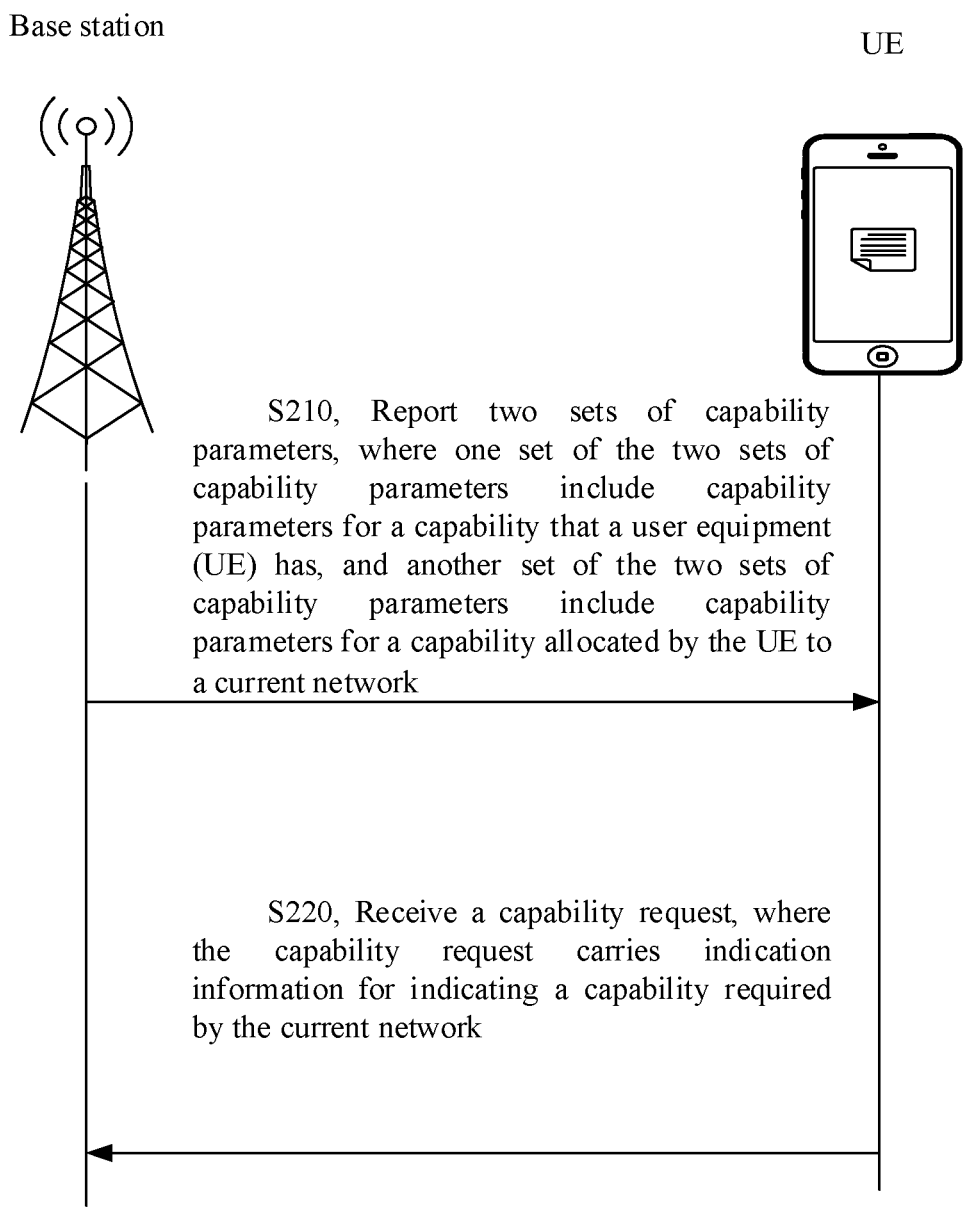
FIG. 9 is a flowchart of a method for processing capability parameters according to another embodiment of the present disclosure.

As shown in FIG. 9, another embodiment of the present disclosure provides a method for processing capability parameters, which may include step S220.

In S220, a capability request may be received. The capability request may carry indication information for indicating a capability required by the current network.

Here, the indication information that indicates the capability required by the current network may be information determined based on the quality-of-service parameters for the current network. For example, when a required downlink service rate corresponding to the quality-of-service parameters for the current network is 500 mb/s, the determined indication frequency band information may be requirement information of the downlink reception capability corresponding to the frequency bands a, b and c.

Here, the capability request may be transmitted when the base station determines, after receiving the downlink service, that the capability of the current UE does not satisfy the quality-of-service requirement corresponding to the downlink service. For example, if the downlink service requires a transmission rate of 500 mb/s, while the transmission rate allocated by the UE to the network corresponding to the base station is merely 400 mb/s, the base station determines that the current UE capability does not satisfy the current service requirement, and issues a capability request indicating that the capability needs to be increased to the UE. The capability request may be transmitted by means of dedicated signaling, where the dedicated signaling may be signaling merely carrying the capability request information. The capability request may be carried in shared signaling and issued. Here, the shared signaling may be signaling carrying other types of information in addition to the capability request information. Use of the shared signaling can save signaling resources. Here, the capability request may be transmitted periodically or may be transmitted based on a data transmission condition of a current network service. For example, when a service quality fluctuation parameter value corresponding to the service quality that corresponds to the current data transmission is within a set threshold value range, the frequency of transmitting the capability request may be increased. When the service quality fluctuation parameter value corresponding to the service quality that corresponds to the current data transmission is outside the set threshold value range, the frequency of transmitting the capability request may be decreased.

In an embodiment, the step S220 may further include receiving the capability request, after reporting the two sets of capability parameters.

Here, the capability request may include a requirement of the UE capability corresponding to a service quality performance parameter, for example, the requirement for the downlink carrier aggregation capability corresponding to the frequency bands a, b, and c. When the UE decides to approve the request from the base station, the UE adjusts the internal circuit, so that the UE can support the implementation of the corresponding capability. For example, the antenna circuit within the UE can be adjusted such that the antenna can support the carrier aggregation.

Figure 10:
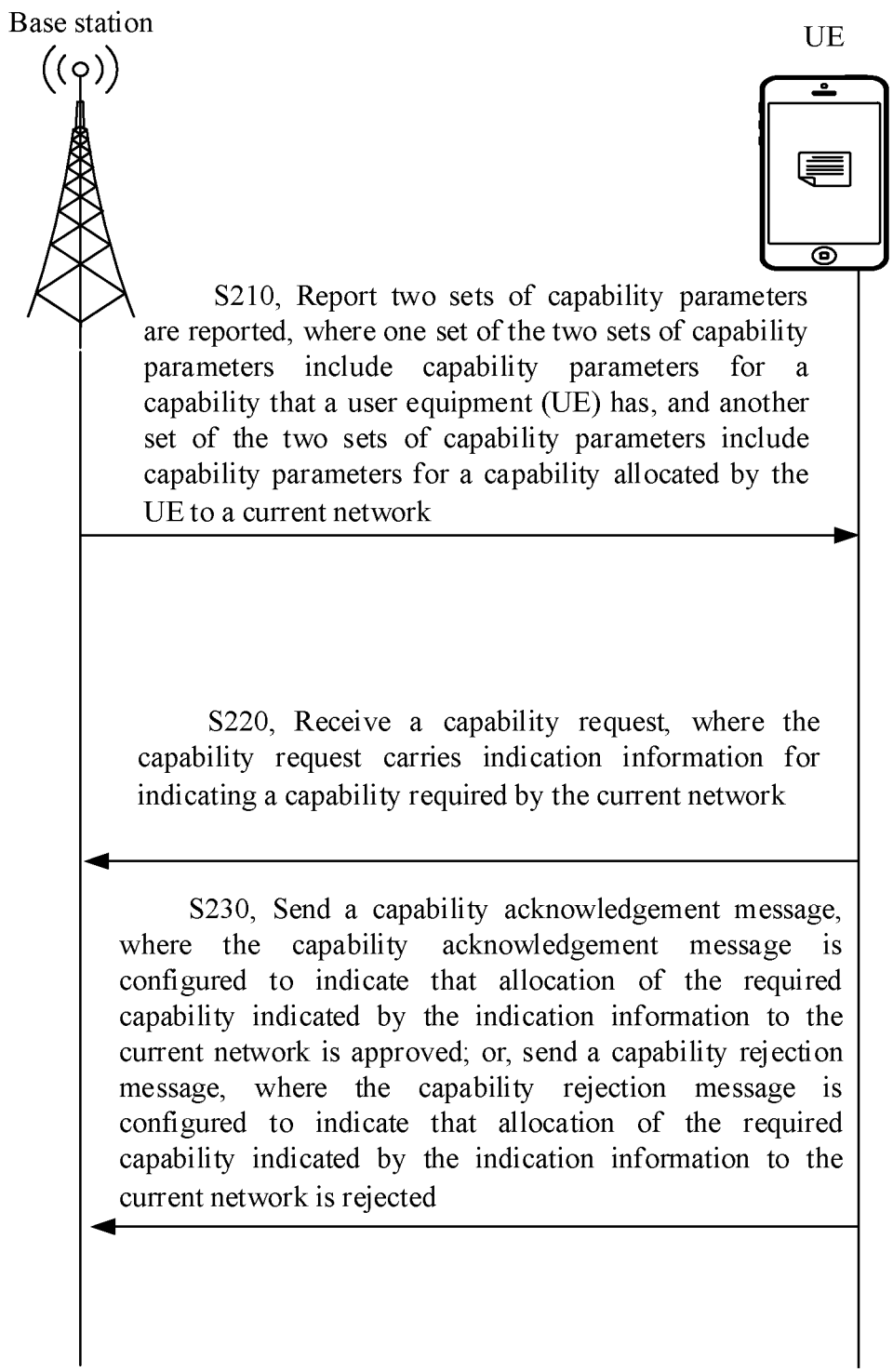
FIG. 10 is a flowchart of a method for processing capability parameters according to another embodiment of the present disclosure.

As shown in FIG. 10, another embodiment of the present disclosure provides a method for processing capability parameters, which may include step S230.

In S230, a capability acknowledgement message may be transmitted. The capability acknowledgement message may be configured to indicate that allocation of the required capability indicated by the indication information to the current network is approved. Alternatively, in the step of S230, a capability rejection message may be transmitted. The capability rejection message may be configured to indicate that allocation of the required capability indicated by the indication information to the current network is rejected.

Here, after receiving the capability acknowledgement message or the capability rejection message, the base station is aware about whether a general corresponding capability that UE has is occupied, which reduce the interruption of other important services in the UE caused by mandatory occupation, etc.

In one embodiment, the method may further include transmitting a capability release request. The base station can be notified to stop occupying the UE capability resources in time.

In order to describe the technical solutions of the present disclosure more clearly, two embodiments of the present disclosure may be further described below.

Embodiment One

Figure 11:
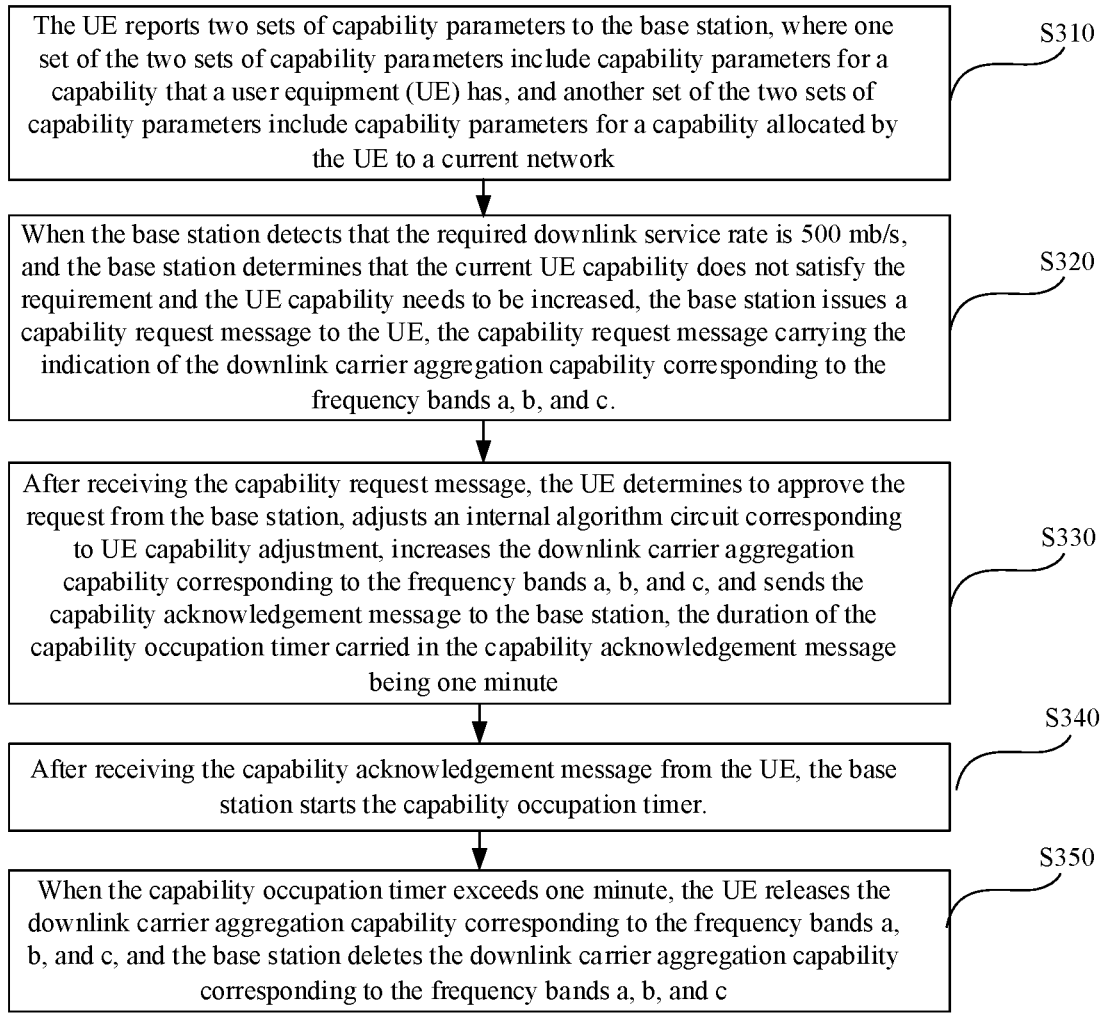
FIG. 11 is a flowchart of a method for processing capability parameters according to another embodiment of the present disclosure.

As shown in FIG. 11, another embodiment of the present disclosure provides a method for processing capability parameters, which may include the following steps S310 to S350.

In S310, the UE may report two sets of capability parameters to the base station. One set of the two sets of capability parameters include capability parameters for a capability that a user equipment (UE) has, and another set of the two sets of capability parameters include capability parameters for a capability allocated by the UE to a current network.

In S320, when the base station detects that the required downlink service rate is 500 mb/s, and determines that the current UE capability does not satisfy the requirement and the UE capability needs to be increased, the base station transmits a capability request message to the UE. The capability request message may carry the indication of the downlink carrier aggregation capability corresponding to the frequency bands a, b, and c.

In S330, after receiving the capability request message, the UE may determine to approve the request from the base station, and adjust the internal algorithm circuit corresponding to the UE capability adjustment. The UE may increase the downlink carrier aggregation capability corresponding to the frequency bands a, b, and c, and then transmit the capability acknowledgement message to the base station. The duration of the capability occupation timer carried in the capability acknowledgement message may be one minute.

In S340, after receiving the capability acknowledgement message from the UE, the base station may start the capability occupation timer.

In S350, when the capability occupation timer exceeds one minute, the UE may release the downlink carrier aggregation capability corresponding to the frequency bands a, b, and c; and the base station may delete the downlink carrier aggregation capability corresponding to the frequency bands a, b, and c.

In the embodiment of the present disclosure, after the base station receives the two sets of capability parameters that are reported, the base station can be aware of not only the capability parameters for the capability allocated by the UE to the current network, but also the capability parameters for the capability that the UE has. Then, after receiving the two sets of capability parameters that are reported, the base station may perform communication services based on the two sets of capability parameters, thereby reducing the probability of communication failure.

Embodiment Two

Figure 12:
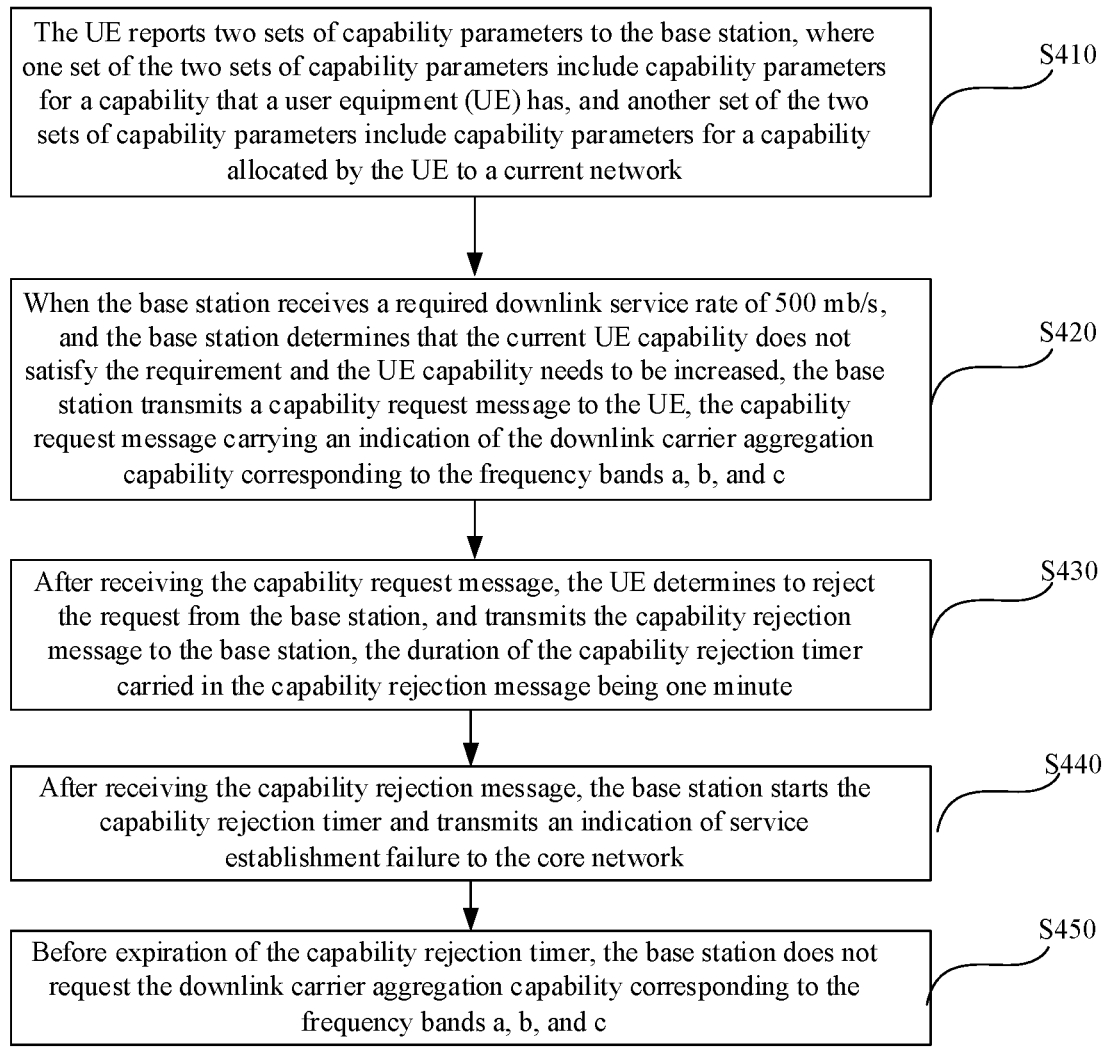
FIG. 12 is a flowchart of a method for processing capability parameters according to another embodiment of the present disclosure.

As shown in FIG. 12, another embodiment of the present disclosure provides a method for processing capability parameters, which may include the following steps S410 to S450.

In S410, the UE may report two sets of capability parameters to the base station. One set of the two sets of capability parameters include capability parameters for a capability that a user equipment (UE) has, and another set of the two sets of capability parameters include capability parameters for a capability allocated by the UE to a current network.

In S420, when the base station receives that the required downlink service rate is 500 mb/s, and determines that the current UE capability does not satisfy the requirement and the UE capability needs to be increased, the base station transmits a capability request message to the UE. The capability request message may carry the indication of the downlink carrier aggregation capability corresponding to the frequency bands a, b, and c.

In S430, after receiving the capability request message, the UE may determine to reject the request from the base station, and transmit the capability rejection message to the base station. The duration of the capability rejection timer carried in the capability rejection message may be one minute.

In S440, after receiving the capability rejection message, the base station may start the capability rejection timer and transmit an indication of service establishment failure to the core network.

In S450, before the expiration of the capability rejection timer, the base station may no longer request the downlink carrier aggregation capability corresponding to the frequency bands a, b, and c.

In the embodiment of the present disclosure, after the UE reports the two sets of capability parameters, the base station can be aware of not only the capability parameters for the capability allocated by the UE to the current network, but also the capability parameters for the capability that the UE has. Then, after receiving the two sets of capability parameters that are reported, the base station may perform communication services based on the two sets of capability parameters, thereby reducing the probability of communication failure.

Figure 13:
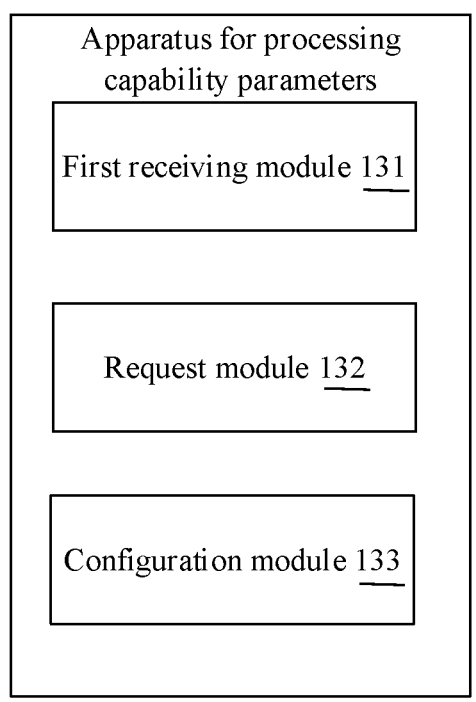
FIG. 13 is a block diagram of a structure for processing capability parameters according to an embodiment of the present disclosure.

As shown in FIG. 13, an embodiment of the present disclosure provides an apparatus for processing capability parameters, which includes a first receiving module 131.

The first receiving module 131 is configured to receive two sets of capability parameters that are reported, wherein one set of the two sets of capability parameters include capability parameters for a capability that a user equipment (UE) has, and another set of the two sets of capability parameters include capability parameters for a capability allocated by the UE to a current network.

In one embodiment, referring again to FIG. 13, the apparatus may further a request module 132.

The request module 132 may be configured to issue a capability request, wherein the capability request carries indication information for indicating a capability required by the current network.

In an embodiment, the request module 132 may be further configured to, after receiving the two sets of capability parameters that are reported, issue the capability request, in response to determining that the capability allocated by the UE to the current network does not satisfy the capability required by the current network.

In an embodiment, the first receiving module 131 may be further configured to receive a capability acknowledgement message, wherein the capability acknowledgement message is configured to indicate that allocation of the required capability indicated by the indication information to the current network is approved. Alternatively, the first receiving module 131 may be configured to receive a capability rejection message, wherein the capability rejection message is configured to indicate that allocation of the required capability indicated by the indication information to the current network is rejected.

In one embodiment, referring again to FIG. 13, the apparatus may further include a configuration module 133.

The configuration module 133 may be configured to configure a capability occupation timer, according to information of the capability occupation timer carried in the capability acknowledgement message, and release an occupied UE capability, in response to expiration of the capability occupation timer.

In an embodiment, the configuration module 133 may be further configured to, before the expiration of capability occupation timer, re-issue the capability request, receive a re-reported capability acknowledgement message based on the re-issued capability request, and reconfigure the capability occupation timer, according to the re-reported capability acknowledgement message.

In an embodiment, the configuration module 133 may further be configured to maintain capability occupation of the UE until receiving a capability release request that is reported, in response to the capability acknowledgement message not carrying information of a capability occupation timer.

In an embodiment, the configuration module 133 may further be configured to configure a capability rejection timer, according to information of the capability rejection timer carried in the capability rejection message, where the capability request is not issued until expiration of the capability rejection timer.

In one embodiment, the request module 132 may further be configured to re-issue the capability request, after the expiration of capability rejection timer.

Figure 14:
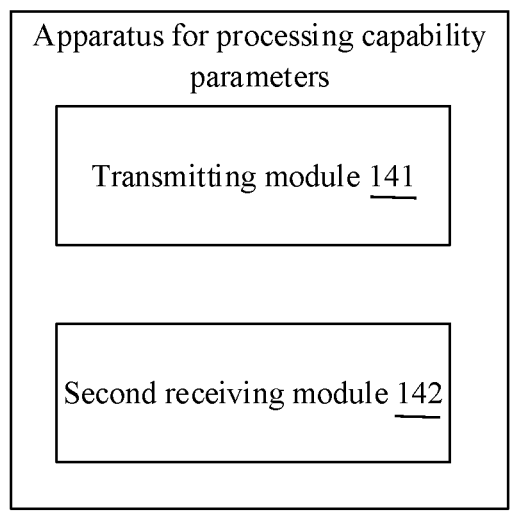
FIG. 14 is a block diagram of a structure for processing capability parameters according to another embodiment of the present disclosure.

As shown in FIG. 14, an embodiment of the present disclosure provides an apparatus for processing capability parameters, which includes a transmitting module 141.

The transmitting module 141 is configured to configured to report two sets of capability parameters, wherein one set of the two sets of capability parameters comprise capability parameters for a capability that a user equipment (UE) has, and another set of the two sets of capability parameters comprise capability parameters for a capability allocated by the UE to a current network.

In one embodiment, referring again to FIG. 4, the apparatus may further include a second receiving module 142.

The second receiving module 142 may be configured to receive a capability request, wherein the capability request carries indication information for indicating a capability required by the current network.

In an embodiment, the second receiving module 142 may further be configured to, after reporting the two sets of capability parameters, receive the capability request.

In an embodiment, the transmitting module 141 may further be configured to transmit a capability acknowledgement message, where the capability acknowledgement message is configured to indicate that allocation of the required capability indicated by the indication information to the current network is approved. Alternatively, the transmitting module 141 may be further configured to transmit a capability rejection message, where the capability rejection message is configured to indicate that allocation of the required capability indicated by the indication information to the current network is rejected.

An embodiment of the present disclosure further provides a communication device, including:
  an antenna;
  a memory;
  a processor respectively connected to the antenna and the memory, controlling the antenna to transmit and receive wireless signals by executing an executable program stored on the memory, and capable of performing steps of the method for processing the capability parameters provided in any of the foregoing embodiments.

The communication device provided in this embodiment may be the foregoing UE or base station. The UE may be various manned terminals or vehicle terminals. The base station may be various types of base stations, such as a 4G base station or a 5G base station.

The antennas may be various types of antennas, such as a 3G antenna, a 4G antenna, or a 5G antenna. The antenna may further include a Wi-Fi antenna, a wireless charging antenna, or the like.

The memory may include various types of storage media, which are non-transitory computer storage media capable of continuing to store information thereon after the communication device is powered down.

The processor may be connected to an antenna and memory via a bus or the like for reading executable programs stored on the memory, for example, at least one of the methods shown in FIGS. 2 to 12.

Embodiments of the present disclosure further provide a non-transitory computer-readable storage medium that stores an executable program, wherein the executable program, when executed by a processor, implements at least one of the steps of the method for processing capability parameters provided in any of the foregoing embodiments, for example, the methods shown in FIGS. 2 to 12.

Figure 15:
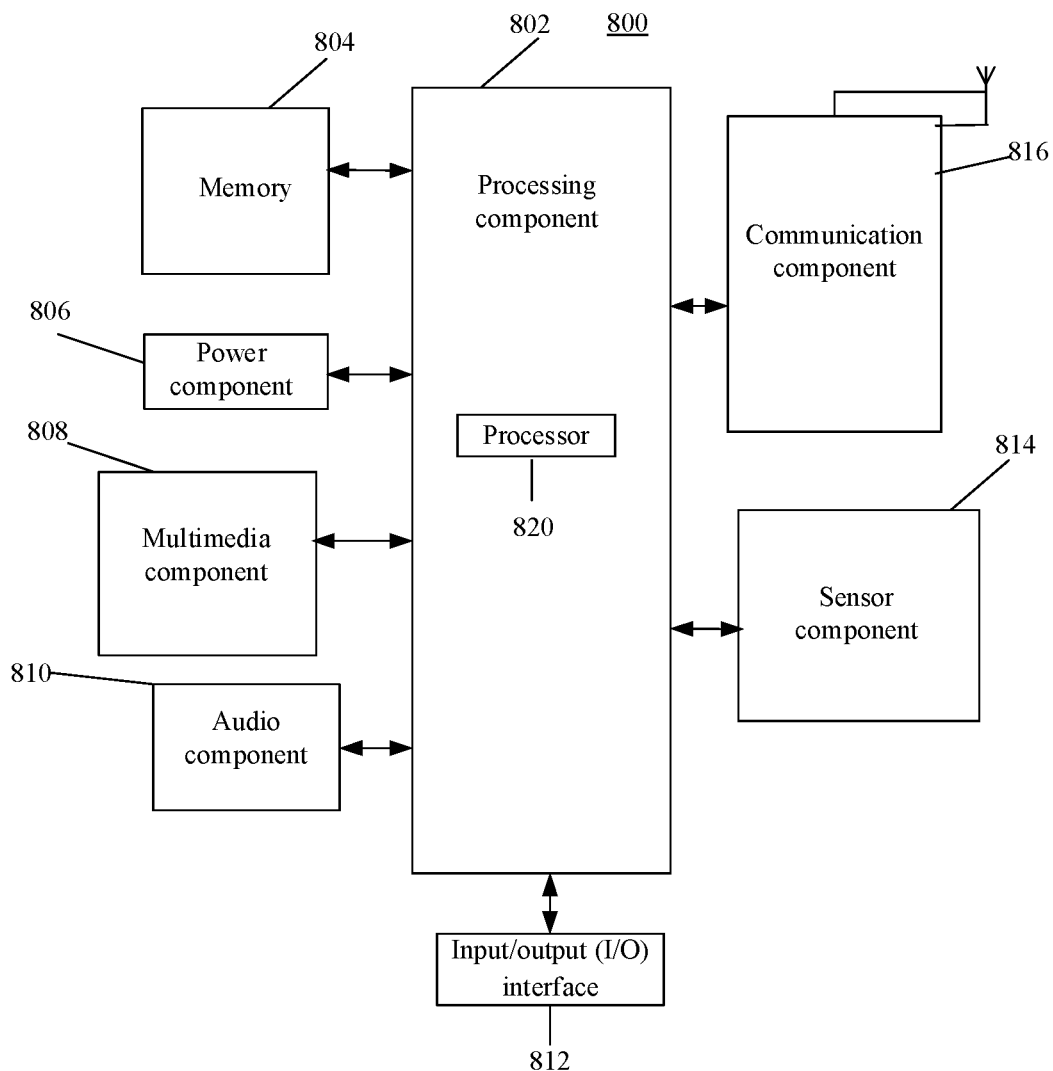
FIG. 15 is a block diagram of a UE according to an embodiment of the present disclosure.

As shown in FIG. 15, an embodiment of the present disclosure provides a structure of a UE.

FIG. 15 provides a UE 800 according to an exemplary embodiment. For example, the UE 800 may be a mobile phone, a computer, a digital broadcast terminal, a messaging device, a gaming console, a tablet, a medical device, exercise equipment, a personal digital assistant, and the like.

Referring to FIG. 15, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or part of the steps in the above-described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as Wi-Fi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer readable storage medium including instructions, such as included in the memory 804, executable by the processor 820 in the UE 800, for performing the above-described methods. For example, the non-transitory computer-readable storage medium may be a ROM, a CD-ROM, a magnetic tape, a floppy disc, an optical data storage device, and the like.

The UE can be configured to implement the aforementioned method for processing capability parameters, for example, the methods for processing capability parameters shown in FIGS. 2 to 12.

Figure 16:
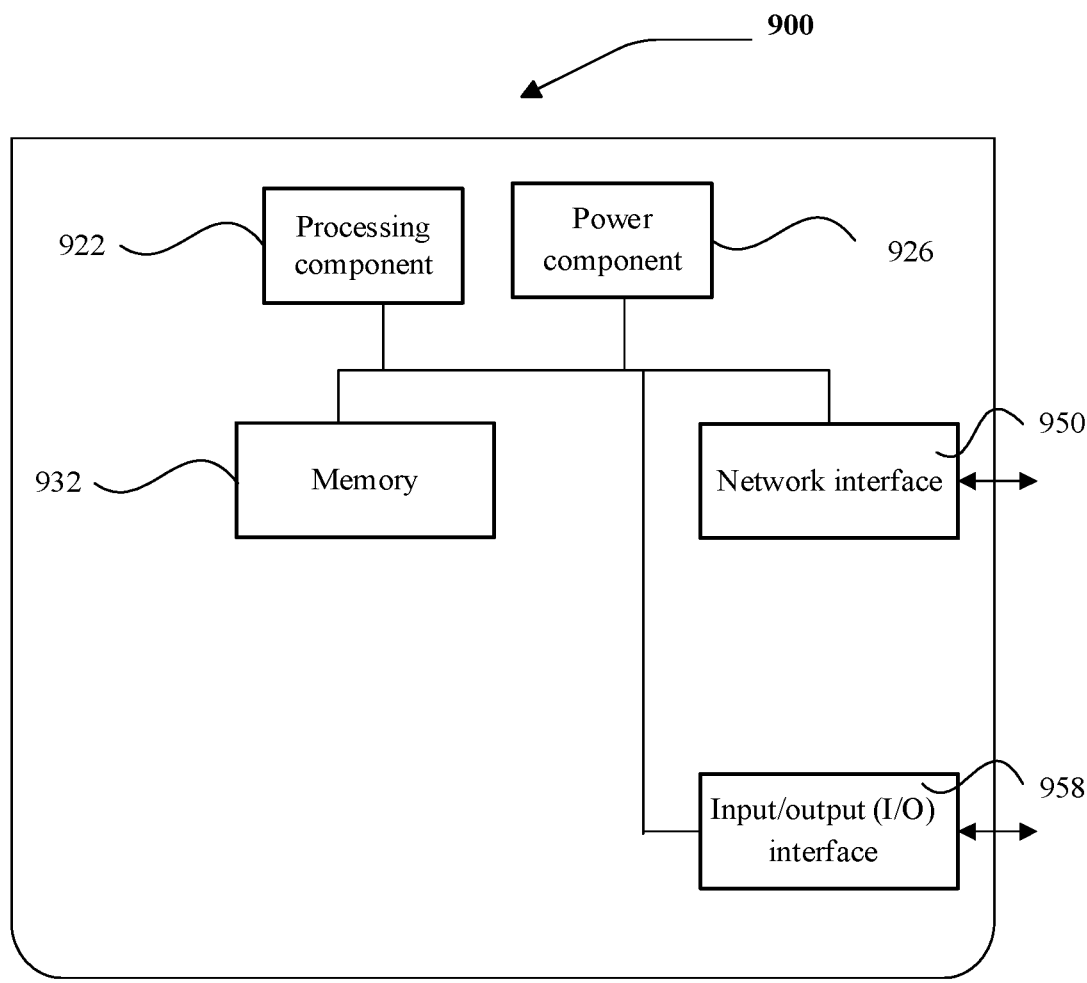
FIG. 16 is a block structural diagram of a base station according to an embodiment of the present disclosure.

As shown in FIG. 16, an embodiment of the present disclosure provides a structure of a base station according to an exemplary embodiment. For example, the base station 900 may be a network-side device. Referring to FIG. 16, the base station 900 may include a processing component 922 which may further include one or more processors, and memory resources represented by a memory 932, for storing instructions (such as application programs) that can be executed by the processing component 922. The application program stored in the memory 932 may include one or more modules, and each of the modules may correspond to a set of instructions. In addition, the processing component 922 may be configured to execute instructions to perform the method for processing capability parameters provided in any of the foregoing embodiments of the disclosure, for example, the methods for processing capability parameters shown in FIGS. 2 to 12.

The base station 900 may also include a power supply 926 configured to perform power management of the base station 900, a wired or wireless network interface 950 configured to connect the base station 900 to the network, and an input/output (I/O) interface 958. The base station 900 may operate the operating system stored in the memory 932, such as Windows Server™, Mac OS X™, Unix™, Linux™, FreeBSD™, or the like.

The wireless network interface 950 may include, but is not limited to, the antenna of the aforementioned communication device. Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for processing capability parameters, performed by a network device and comprising:
receiving two sets of capability parameters that are reported by user equipment (UE), wherein one set of the two sets of capability parameters comprise capability parameters for a capability that the UE has, and another set of the two sets of capability parameters comprise capability parameters for a capability allocated by the UE to a current network; wherein the capability that the UE has is a sum of parameters corresponding to a capability allocated by the UE to one or more networks including the current network and a remaining capability that has not been allocated;
issuing to the UE a capability request for increasing the capability allocated by the UE to the current network, in response to determining that the capability allocated by the UE to the current network does not satisfy a capability required by the current network; and
performing a communication service according to the capability parameters for the capability allocated by the UE to the current network, in response to that the capability allocated by the UE to the current network satisfies the capability required by the current network.

2. The method of claim 1, wherein the capability request carries indication information for indicating a capability required by the current network.

3. The method of claim 2, further comprising:
receiving a capability acknowledgement message, wherein the capability acknowledgement message is configured to indicate that allocation of the required capability indicated by the indication information to the current network is approved;
or,
receiving a capability rejection message, wherein the capability rejection message is configured to indicate that allocation of the required capability indicated by the indication information to the current network is rejected.

4. The method of claim 3, further comprising:
configuring a capability occupation timer, according to information of the capability occupation timer carried in the capability acknowledgement message; and
releasing an occupied UE capability, in response to expiration of the capability occupation timer.

5. The method of claim 4, further comprising:
before the expiration of the capability occupation timer, re-issuing the capability request;
receiving a re-reported capability acknowledgement message based on the re-issued capability request; and
reconfiguring the capability occupation timer, according to the re-reported capability acknowledgement message.

6. The method of claim 3, further comprising:
configuring a capability rejection timer, according to information of the capability rejection timer carried in the capability rejection message;
wherein the capability request is not issued until expiration of the capability rejection timer.

7. A method for processing capability parameters, performed by user equipment (UE) and comprising:
reporting two sets of capability parameters to a network device, wherein one set of the two sets of capability parameters comprise capability parameters for a capability that the UE has, and another set of the two sets of capability parameters comprise capability parameters for a capability allocated by the UE to a current network; wherein the capability that the UE has is a sum of parameters corresponding to a capability allocated by the UE to one or more networks including the current network and a remaining capability that has not been allocated;

receiving, from the network device, a capability request for increasing the capability allocated by the UE to the current network, when the capability allocated by the UE to the current network does not satisfy a capability required by the current network; and performing a communication service according to the capability parameters for the capability allocated by the UE to the current network, when the capability allocated by the UE to the current network satisfies the capability required by the current network.

8. The method of claim 7, wherein the capability request carries indication information for indicating a capability required by the current network.

9. The method of claim 8, further comprising:
transmitting a capability acknowledgement message, wherein the capability acknowledgement message is configured to indicate that allocation of the required capability indicated by the indication information to the current network is approved;
or,
transmitting a capability rejection message, wherein the capability rejection message is configured to indicate that allocation of the required capability indicated by the indication information to the current network is rejected.

10. The method of claim 9, further comprising:
transmitting a capability release request.

11. A network device, comprising:
an antenna;
a memory;
a processor connected to the antenna and the memory, and configured to control the antenna to transmit and receive wireless signals by executing an executable program stored in the memory, and configured to:
receive two sets of capability parameters that are reported by user equipment (UE), wherein one set of the two sets of capability parameters comprise capability parameters for a capability that the UE has, and another set of the two sets of capability parameters comprise capability parameters for a capability allocated by the UE to a current network; wherein the capability that the UE has is a sum of parameters corresponding to a capability allocated by the UE to one or more networks including the current network and a remaining capability that has not been allocated;

issue to the UE a capability request for increasing the capability allocated by the UE to the current network, in response to determining that the capability allocated by the UE to the current network does not satisfy a capability required by the current network; and perform a communication service according to the capability parameters for the capability allocated by the UE to the current network, in response to that the capability allocated by the UE to the current network satisfies the capability required by the current network.

12. The network device of claim 11, wherein the capability request carries indication information for indicating a capability required by the current network.

13. The network device of claim 12, wherein the processor is further configured to receive a capability acknowledgement message, wherein the capability acknowledgement message is configured to indicate that allocation of the required capability indicated by the indication information to the current network is approved;
or,
wherein the processor is further configured to receive a capability rejection message, wherein the capability rejection message is configured to indicate that allocation of the required capability indicated by the indication information to the current network is rejected.

14. The network device of claim 13, wherein the processor is further configured to configure a capability occupation timer, according to information of the capability occupation timer carried in the capability acknowledgement message, and release an occupied UE capability, in response to expiration of the capability occupation timer.

15. The network device of claim 14, wherein the processor is further configured to, before the expiration of capability occupation timer, re-issue the capability request, receive a re-reported capability acknowledgement message based on the re-issued capability request, and reconfigure the capability occupation timer, according to the re-reported capability acknowledgement message.

16. A user equipment (UE) configured to perform the method of claim 7, the UE comprising:
an antenna;
a memory;
a processor connected to the antenna and the memory, and configured to control the antenna to transmit and receive wireless signals by executing an executable program stored in the memory, and configured to perform operations of the method.

17. The UE of claim 16, wherein the capability request carries indication information for indicating a capability required by the current network.

* * * * *